March 12, 1940. N. G. THOR Re. 21,398

DISPENSING UNIT FOR PAPER SHEETS

Original Filed Dec. 9, 1937 2 Sheets-Sheet 1

INVENTOR
Nils Gustav Thor
BY
Glück & Reitenfeld
ATTORNEYS

March 12, 1940. N. G. THOR Re. 21,398

DISPENSING UNIT FOR PAPER SHEETS

Original Filed Dec. 9, 1937 2 Sheets-Sheet 2

INVENTOR
Nils Gustav Thor
BY
Buck + Greitenfeld
ATTORNEYS

Reissued Mar. 12, 1940

Re. 21,398

UNITED STATES PATENT OFFICE 21,398

DISPENSING UNIT FOR PAPER SHEETS

Nils Gustav Thor, Clifton, N. J., assignor to The Hamersley Manufacturing Company, Garfield N. J., a corporation of New Jersey Original No. 2,142,808, dated January 3, 1939, Serial No. 178,838, December 9, 1937. Application for reissue March 3, 1939, Serial No. 259,633

14 Claims. (Cl. 206—57)

My present invention relates generally to dispensing devices, and has particular reference to a device for dispensing a stack of paper sheets or the like.

The present construction is designed primarily for use by retail dispensers of food commodities, such as delicatessen stores, the intention being that the user will have readily available a series of sheets of paper or the like, such as grease-proof paper, to be used in wrapping the commodities.

It is a primary object to provide a dispensing unit which is disposable in its entirety after all the sheets of an accommodated stack have been used up, whereby there will be no necessity for mounting a relatively permanent box or cabinet nor for periodically refilling the same.

With this primary object in view, it is a particular feature of my invention to provide an arrangement of parts which permits the container or box to be inexpensively manufactured of cardboard or equivalent material.

Nevertheless, certain features of my invention are not necessarily restricted to the employment of a disposable box of cardboard or the like, and certain advantageous features of the present construction may find wider applicability in connection with relatively permanent metal cabinets or boxes.

In the preferred embodiment herein illustrated and hereinafter to be described, a box of cardboard is so constructed that it may be manufactured sufficiently inexpensively to permit its sale along with an accommodated stack of sheets without materially increasing the cost of the unit; and to permit the box subsequently to be disposed of in its entirety. Preferably, the box is composed of a single element of cardboard cut and folded to permit it to be set up into substantially rectangular form.

One of the features of the present construction lies in the arrangement of an outlet opening near the upper front edge of the box, together with means for accommodating a stack of sheets in an upwardly arched position so that the sheets may be drawn successively in an upwardly oblique forward direction through the outlet opening.

More particularly, my construction provides for a base having a rearwardly declining rear portion for supporting the stack in upwardly arched condition, and a yieldable follower adapted to press downwardly upon the stack. Where the box is made of cardboard the follower may constitute an integral portion of the top wall, and may advantageously be shaped to define a V cross-section.

The present box is further characterized by a front wall provided with a recess narrower than the stack of sheets and exposing the front of the stack for the full depth of the latter. The front wall thus prevents intentional or accidental withdrawal of the sheets through the front wall, yet permits each successive sheet of the stack to be manually grasped for withdrawal purposes through the outlet opening.

Another important feature of my invention lies in the provision of a stack of sheets each of which is folded to define a Z cross-section, the sheets being nevertheless free of interengagement with one another. This desirable objective is accomplished by constructing each sheet with the body of the Z longer than the combined lengths of the Z ends. A stack of sheets thus free of interengagement is relatively simple to manufacture, involving no unusually complicated machinery, and the stack itself is a compact rectangular unit.

The reason why I am enabled to employ sheets of this character is that the box is so constructed and arranged that the withdrawal of each sheet has a tendency automatically to bring about an interengagement of the sheet with the ensuing sheet, thereby positioning the next sheet in readily graspable position. This operation will be more fully set forth hereinafter.

I achieve the foregoing objects, and such other objects as may hereinafter appear or be pointed out, in the manner illustratively exemplified in the accompanying drawings, wherein—

Figure 7:
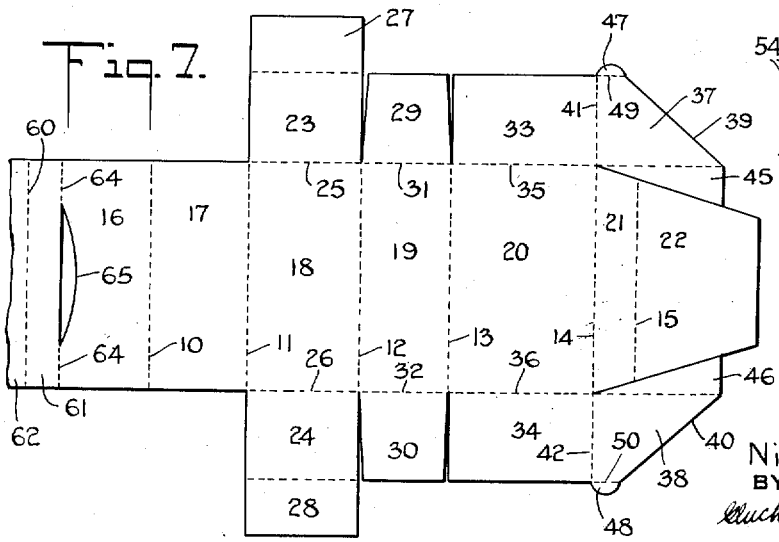
Figure 7 is a plan view of the blank from which the box may be constructed.

In the preferred construction, the box is composed of an integral blank of cardboard or the like initially shaped, cut, and scored substantially as shown in Figure 7. Referring to this figure, it will be observed that the body portion of the blank is divided by transverse score lines 10, 11, 12, 13, 14 and 15 into a series of adjacent sections 16, 17, 18, 19, 20, 21 and 22. The sections 16–20 are substantially rectangular, whereas the sections 21 and 22 are trapezoidal.

Extending laterally from the section 18 are the sections 23 and 24 connected to the section 18 at the score lines 25 and 26, respectively. The sections 23 and 24 carry the additional lateral flaps 27 and 28.

Extending laterally from the section 19 are the sections 29 and 30 connected to the section 19 by the score lines 31 and 32.

Extending laterally from the section 20 are the sections 33 and 34 connected to the section 20 by the score lines 35 and 36.

Extending forwardly from the sections 33 and 34 are the front sections 37 and 38, these sections having the oblique edges 39 and 40 and being secured to the sections 33 and 34 along the score lines 41 and 42.

The sections 37 and 38 carry the triangular flaps 45 and 46.

Furthermore, the sections 37 and 38 carry the small lateral tabs 47 and 48 secured to the sections 37 and 38 along the score lines 49 and 50.

In setting up the box, the section 20 defines a substantially rectangular bottom and the section 19 is folded upwardly to define the back wall. The sections 29 and 30 are arranged in parallel relationship along the score lines 35 and 36, respectively, and the sections 33 and 34 are then bent upwardly to define the sides of the box.

The section 18 is then swung forwardly along the score line 12 so as to define a top wall, and the sections 23 and 24 are folded down over the sections 33 and 34. The attachment sections 28 and 27 are then turned inwardly beneath the bottom wall of the box and are adhesively or otherwise secured in this position.

As thus far described, the box comprises a bottom wall and a top wall, a back wall, and two sides; and whereas I have described one way of setting up a structure of this kind, it will be understood that my invention is not necessarily restricted to the particular method of folding or assembly.

It should be noted, however, that in accordance with my invention the top wall 18 is not as deep as the bottom wall 20, the forward edge of the top wall (defined by the score line 11) lying slightly to the rear of the forward edge 14 of the bottom wall 20.

Figure 3:
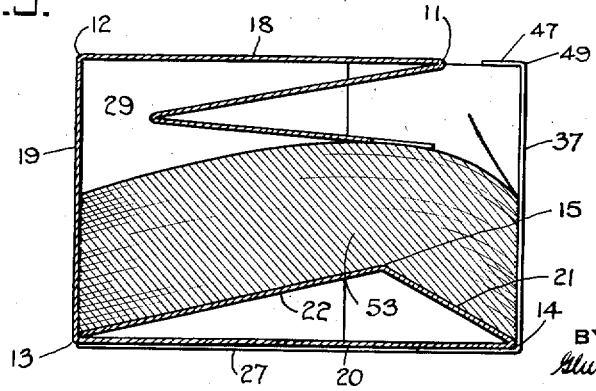
Figure 3 is a cross-sectional view taken substantially along the line 3—3 of Figure 1.
Figure 5:
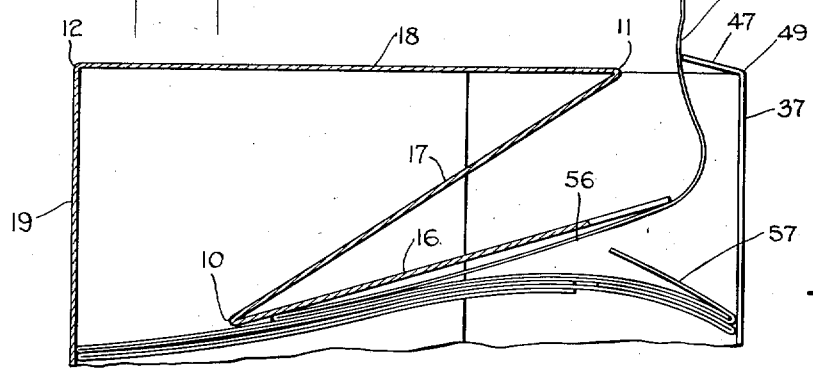
Figure 5 is a fragmentary cross-sectional view, similar to Figure 3, on an enlarged and somewhat exaggerated scale to indicate the mode of use.

The sections 17 and 16 are then doubled upon themselves, as shown most clearly in Figures 3 and 5, to define a yieldable follower of substantially V cross-section, the apex of the V (defined by the score line 10) extending rearwardly. Because of the inherent resilience of cardboard or its equivalent this V-shaped follower extends rearwardly downwardly into the box and is adapted to exert a highly efficient yieldable pressure in a downward and forward direction upon the stack of sheets accommodated in the box.

In completing the initial set-up of the box, the sections 21 and 22 are folded upwardly along the lines 14 and 15 so that the section 22 ultimately defines a rearwardly declining rear portion of a base, as shown most clearly in Figure 3; the section 21 defining a downwardly sloping front portion of the base.

Figure 1:
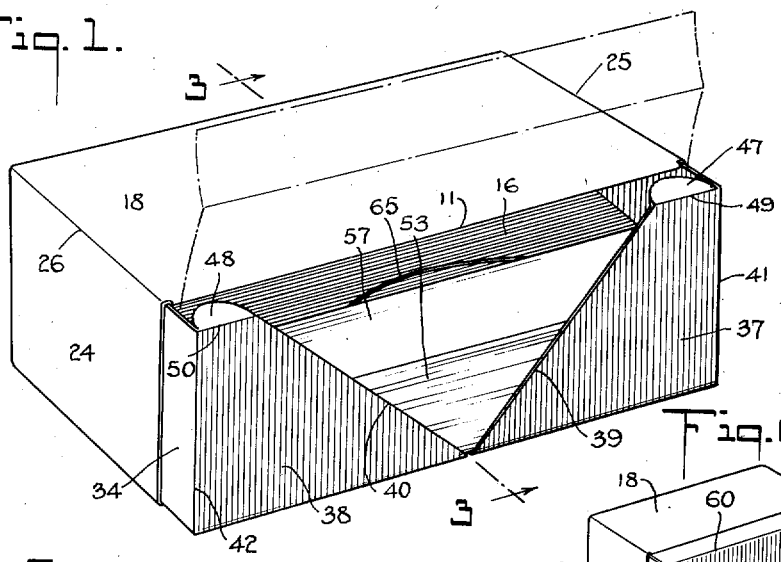
Figure 1 is a perspective view of a dispensing unit constructed in accordance with the present invention.
Figure 8:
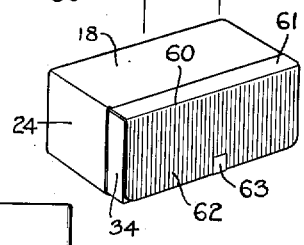
Figure 8 is a perspective view of a preferred construction of a unit as it appears when it is manufactured.
Figure 2:
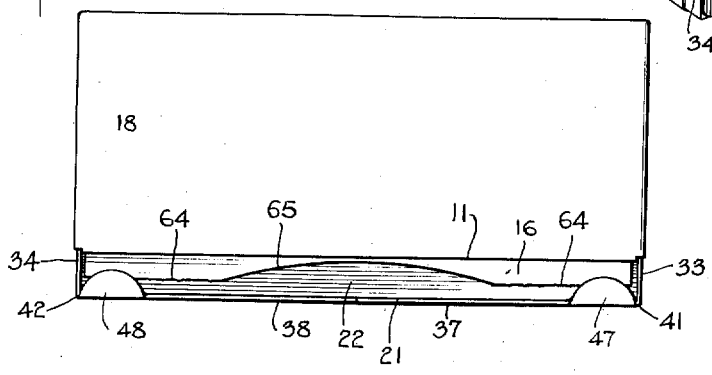
Figure 2 is a plan view thereof, with the stack of sheets omitted.

The assembly is then completed by swinging the sections 37 and 38 into alignment, the flaps 45 and 46 being positioned beneath the box and secured by adhesive means or otherwise. The sections 37 and 38 thereby define a front wall having a recess, this recess in the illustrated embodiment being substantially V-shaped, as shown most clearly in Figure 1.

The flaps 47 and 48 are then bent rearwardly into the plane of the top wall 18.

The result is that an outlet opening is defined immediately in front of the forward edge 11 of the top of the box, this outlet opening being of the full width of the box. In this connection, it should be observed that the recess in the front wall is of less width than the box.

It will be understood that the unit, during its assembly, is caused to accommodate a stack of sheets, this stack being designated generally by the reference numeral 53. The stack rests upon the base 21—22 and is yieldably pressed down by the follower 16—17, the stack thus assuming an upwardly arching position, as shown most clearly in Figure 3. The forward face of the stack is partially exposed for its full depth through the recess in the front wall.

Preferably, when the box is constructed, the original blank is provided with an extension divided by the score line 60 into two additional panels 61 and 62, whereby the panel 61 may be arranged at the forward portion of the top to seal the outlet opening, and the panel 62 may be arranged to cross the front wall to conceal the latter. A removable sticker or tab 63 holds the free edge of the panel 62 in position. Thus, the box may be manufactured, stacked, stored, and shipped in a completely sealed condition.

When it is ready for use, the sticker 63 is removed or mutilated, and the panels 62 and 61 are bodily severed from the box along the score lines 64, thus leaving the unit in the condition illustrated in Figures 1–3 and 5.

Preferably, but not necessarily, the forward edge of the section 16 is concaved, as at 65.

It may be pointed out that the relative sizes of the sections shown in Figure 7 are not exactly in accord with the relative sizes of the corresponding sections shown in set-up condition in the other figures; nor are the other figures in entire accord. Thus, in Figure 3, the back wall 19 is somewhat longer, relative to the bottom wall 20, than the relationship between the sections 19 and 20 in Figures 1 and 7. These discrepancies arise because of the desire to illustrate the invention in a compact manner. The relative proportions of the parts are, therefore, not to be gauged too accurately from the drawings themselves.

Figure 4:
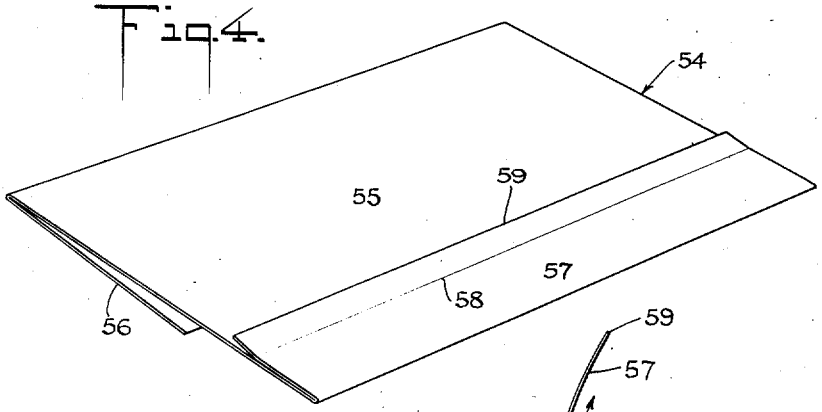
Figure 4 is a perspective view of one sheet of the stack of sheets.
Figure 6:
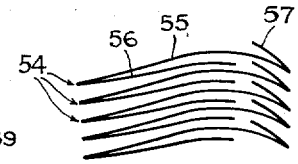
Figure 6 is an exaggerated cross-sectional view showing the normal relationship of the sheets in the stack.

Before describing the manner in which the device is used, reference will be had to Figures 4 and 6. In Figure 4, a single sheet of the stack 53 is designated by the reference numeral 54. This sheet has a cross-section conforming substantially to the letter Z. I have designated the body of the Z by the reference numeral 55 and the Z ends by the reference numerals 56 and 57. It will be observed that the length of the body 55 is greater than the combined lengths of the Z ends 56 and 57. As a result, a plurality of these sheets may be stacked, as shown in Figure 6, without any interengagement between the sheets.

Preferably, but not necessarily, there is a score line 58 near and parallel to the free edge 59 of the portion 57. This score line 58 has the tendency to induce a slight elevation of the edge 59. It will further be observed that the curved position of the sheets will induce a slight elevation of the edge 59.

It will also be observed that the sections 57 of the sheets are somewhat shorter than the sections 56; and that when the stack is accommodated in the box the sections 57 are arranged forwardly.

In use, the person desiring to withdraw a sheet from the unit has ready access to the uppermost sheet through the recess in the front wall. He merely grasps the elevated portion 57 (see Figure 3) and pulls the sheet upwards and forwardly through the outlet opening, as shown in Figure 5. This operation not only straightens out the sheet to destroy its Z cross-section, but it also has the effect of causing a temporary interengagement between the portions 56 and 57 of the ensuing sheet. This temporary interengagement is shown most clearly in Figure 5. Accordingly, as the sheet is withdrawn from the unit it not only straightens itself out, ready for use in wrapping a commodity, but it also elevates the section 57 of the ensuing sheet to facilitate the subsequent grasp of the ensuing sheet when the operation is repeated.

As the sheets are withdrawn, the depth of the stack decreases and the yieldable follower continues to press down upon the decreasing stack to hold the remaining sheets in proper position. Ultimately, after all the sheets have been withdrawn, the empty box may be discarded and another complete unit may be substituted.

Obviously, the various features of the present invention are not necessarily restricted to a box that is made of cardboard although, as hereinbefore stated, the invention is peculiarly adaptable for embodiment in a cardboard box.

Moreover, it will be understood that certain phases of the invention do not require that the sheets be of Z-shaped cross-section, nor that they necessarily be of greaseproof paper. The invention may find wider applicability in the dispensing of sheets of differing characteristics for various purposes.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is:

1. A disposable dispensing unit for a stack of paper sheets, comprising a substantially rectangular cardboard box with an outlet opening near its upper front edge, a base for supporting said stack in upwardly arched position, and a yieldable follower adapted to press downwardly upon the stack, said follower extending obliquely downwardly from said outlet opening.

2. A disposable dispensing unit for a stack of paper sheets, comprising a substantially rectangular cardboard box with an outlet opening near its upper front edge, a base for supporting said stack in upwardly arched position, and a yieldable follower adapted to press downwardly upon the stack, said follower extending obliquely downwardly from said outlet opening, said box having a bottom wall, and said base comprising a rearwardly declining rear portion and a forward portion extending downwardly to the front edge of said bottom wall.

3. A disposable dispensing unit for a stack of paper sheets, comprising a substantially rectangular cardboard box with an outlet opening near its upper front edge, a base for supporting said stack in upwardly arched position, and a yieldable follower adapted to press downwardly upon the stack, said follower extending obliquely downwardly from said outlet opening, said box having a bottom wall, said base being an integral extension of said bottom wall.

4. A disposable dispensing unit for a stack of paper sheets, comprising an integral blank of cardboard cut and folded to define a set-up substantially rectangular box having top and bottom walls, side walls, and a rear wall, the bottom wall having a front extension doubled back to define an upwardly converging base upon which the stack is supported in upwardly arched position, the top wall having a front extension doubled back to define a yieldable rearwardly declining follower for the stack, whereby the sheets may be successively withdrawn in an upwardly oblique forward direction.

5. A disposable dispensing unit for a stack of paper sheets, comprising an integral blank of cardboard cut and folded to define a set-up substantially rectangular box having top and bottom walls, side walls, and a rear wall, the bottom wall having a front extension doubled back to define a base upon which the stack is supported in upwardly arched position, the top wall having a front extension doubled back to define a yieldable rearwardly declining follower for the stack, whereby the sheets may be successively withdrawn in an upwardly oblique forward direction, said box having a front wall with a downwardly narrowing recess exposing the front of said stack for the full depth of the latter.

6. A disposable dispensing unit for a stack of paper sheets, comprising an integral blank of cardboard cut and folded to define a set-up substantially rectangular box having top and bottom walls, side walls, and a rear wall, the bottom wall having a front extension doubled back to define a base upon which the stack is supported in upwardly arched position, the top wall having a front extension doubled back to define a yieldable rearwardly declining follower for the stack, whereby the sheets may be successively withdrawn in an upwardly oblique forward direction, said box having a front wall with a downwardly narrowing recess exposing the front of said stack for the full depth of the latter, the widest portion of said recess being narrower than said stack to prevent forward movement of the stack or of any sheet thereof.

7. A disposable dispensing unit for a stack of paper sheets, comprising an integral blank of cardboard cut and folded to define a set-up substantially rectangular box having top and bottom walls, side walls, and a rear wall, the bottom wall having a front extension doubled back to define a base upon which the stack is supported in upwardly arched position, the top wall having a front extension doubled back to define a yieldable rearwardly declining follower for the stack, the box being provided with an outlet opening in front of the forward edge of the top wall, whereby the sheets may be successively withdrawn in an upwardly oblique forward direction through said outlet opening.

8. A disposable dispensing unit as set forth in claim 7, said box having a front wall with a downwardly narrowing recess exposing the front of said stack for the full depth of the latter, the widest portion of said recess being narrower than said stack to prevent forward movement of the stack or of any sheet thereof, thereby compelling withdrawal of the sheets through said outlet opening.

9. As an element of a stack of paper sheets adapted to be assembled in a dispensing unit of the character described, a sheet folded to define a Z cross-section, the body of the Z being longer than the combined lengths of the Z ends, and one Z end being scored near and parallel to its free edge to induce an elevation of said Z end from the body of the Z.

10. A dispensing unit for a stack of paper sheets, comprising a substantially rectangular box with an outlet opening near its upper front edge, an upwardly angled base for supporting said stack in upwardly arched position, a yieldable follower adapted to press downwardly upon the stack, said follower extending obliquely downwardly from said outlet opening, said box having a front wall with a recess narrower than the stack and exposing the front of the stack for the full depth of the latter.

11. A disposable dispensing unit as set forth in claim 7, said box having a front wall with a recess exposing the front of said stack for the full depth of the latter, said recess being narrower than said stack to prevent forward movement of the stack or of any sheet thereof, thereby compelling withdrawal of the sheets through said outlet opening.

12. A disposable dispensing unit as set forth in claim 1, said follower having a V-shaped cross-section with the apex of the V directed rearwardly.

13. A disposable dispensing unit as set forth in claim 1, said box having a top wall terminating at said opening, and said follower being an integral extension of said top wall.

14. A dispensing unit for a stack of paper sheets, comprising an elongated substantially rectangular box formed of paper board and having top and bottom, end, back and front walls, said top wall having the forward edge thereof spaced rearwardly from the front wall with an outlet opening therebetween extending lengthwise of the box, said front wall having a recess therein extending downwardly from the upper edge thereof and of appreciably less width at said upper edge than the length of the outlet opening, and a base arranged in the box over the bottom wall for supporting the stack in upwardly arched position, said base being formed by a paper board sheet of substantially inverted V-shape supported at opposite edges by the corners of the box and with the apex thereof extending parallel with said forward edge of the top wall and substantially therebeneath.

NILS GUSTAV THOR.